United States Patent
Takahashi et al.

(10) Patent No.: US 7,942,962 B2
(45) Date of Patent: May 17, 2011

(54) MONOAZO METAL COMPLEX, AZO-TYPE PIGMENT DISPERSANT, AND PIGMENT COMPOSITION COMPRISING THE AZO-TYPE PIGMENT DISPERSANT

(75) Inventors: Shinjirou Takahashi, Kita-ku (JP); Akio Kuwahara, Kita-ku (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/450,850

(22) PCT Filed: Apr. 22, 2008

(86) PCT No.: PCT/JP2008/057727
§ 371 (c)(1),
(2), (4) Date: Jan. 15, 2010

(87) PCT Pub. No.: WO2008/133241
PCT Pub. Date: Nov. 6, 2008

(65) Prior Publication Data
US 2010/0120951 A1    May 13, 2010

(30) Foreign Application Priority Data

Apr. 23, 2007   (JP) ................. 2007-112509

(51) Int. Cl.
| C09B 67/20 | (2006.01) |
| C09B 45/14 | (2006.01) |
| C09B 45/18 | (2006.01) |
| C09B 45/20 | (2006.01) |
| C09B 45/22 | (2006.01) |
| C09B 67/36 | (2006.01) |
| B01F 17/12 | (2006.01) |
| B01F 17/32 | (2006.01) |
| C09D 11/00 | (2006.01) |

(52) U.S. Cl. ........ 106/496; 106/493; 106/494; 106/498; 106/499; 524/100

(58) Field of Classification Search ........... 106/493, 106/494, 495, 496, 497, 498, 499; 524/100
See application file for complete search history.

(56) References Cited

U.S. PATENT DOCUMENTS

| 4,256,507 A | 3/1981 | Kranz et al. ............ 106/288 Q |
| 4,828,572 A | 5/1989 | Sutterlin et al. .................. 8/549 |
| 4,863,522 A | 9/1989 | Jost et al. ...................... 106/494 |
| 6,261,358 B1 | 7/2001 | Sommer et al. ............... 106/496 |
| 6,350,307 B1 * | 2/2002 | Linke et al. ................... 106/496 |
| 6,448,385 B2 * | 9/2002 | Herrmann et al. ............ 534/707 |
| 6,478,866 B1 * | 11/2002 | Nyssen et al. ................ 106/503 |
| 6,551,682 B1 * | 4/2003 | Tosaki et al. ................. 428/64.1 |
| 6,596,446 B2 * | 7/2003 | Wolf et al. ......................... 430/7 |
| 6,627,368 B2 * | 9/2003 | Okubo et al. ............ 430/108.23 |
| 7,081,160 B2 * | 7/2006 | Hamada ....................... 106/496 |
| 7,342,062 B2 * | 3/2008 | Tada et al. .................... 524/190 |
| 2005/0241532 A1 * | 11/2005 | Feldhues et al. ............. 106/496 |

FOREIGN PATENT DOCUMENTS

| JP | 9-16787 | 8/1939 |
| JP | 41-2466 | 2/1941 |
| JP | 50-4019 | 2/1975 |
| JP | 55-108466 | 8/1980 |
| JP | 62-21881 | 1/1987 |
| JP | 63-172772 | 7/1988 |
| JP | 2000-119544 | 4/2000 |
| JP | 2005-344055 | 12/2005 |
| JP | 2009-143993 A * | 7/2009 |
| WO | 2006/106110 | 10/2006 |

OTHER PUBLICATIONS

Azerbaijani Chemical Journal #3, 1972, ISSN 0005-2531, p. 146-151, p. 148, structural formula, lines 20 to 25, p. 149, lines 2 to 5; Akhmedli, M.K., et al.; "A Research of the Reaction of Complexation of Indium and Gallium with Lumomagneson with the Use of the Luminescent Method".

Revista De Chimie, 44(2), 1993; ISSN 00347752, p. 133-136, compounds Vllb, Vllla, table 2, p. 135, lines 28 to 30; Sebe, I et al.; "Synthesis and Uses of Metallcomplex Dispersion Azo Dyes".

* cited by examiner

*Primary Examiner* — Anthony J Green
(74) *Attorney, Agent, or Firm* — Nields, Lemack & Frame, LLC

(57) ABSTRACT

Disclosed is a monoazo metal complex represented by the formula (1)

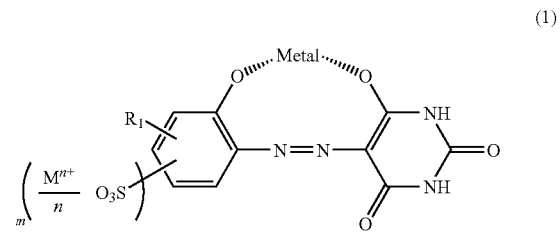

wherein $R_1$ represents a hydrogen atom, a $C_1$-$C_4$ alkyl group, a $C_1$-$C_4$ alkoxy group, a chlorine atom, a bromine atom or a nitro group; M represents a hydrogen atom, a sodium, a potassium, a magnesium, a calcium, a barium or an aluminum; $M^{n+}$ represents a n-valent cation; Metal represents Ni, Fe, Cu, Co or Al; m represents an integer of 1 or 2; and n represents an integer of 1, 2 or 3.

16 Claims, No Drawings

MONOAZO METAL COMPLEX, AZO-TYPE PIGMENT DISPERSANT, AND PIGMENT COMPOSITION COMPRISING THE AZO-TYPE PIGMENT DISPERSANT

TECHNICAL FIELD

The present invention relates to a monoazo metal complex, an azo-type pigment dispersant, and a pigment composition which is used as a color filter resist used in the manufacture of a liquid crystal display or imaging device or an inkjet ink, with fine particle size and excellent fluidity and transparency.

BACKGROUND ART

Pigments have been used as paint or printing ink, and recently as a coloring agent for a color filter resist or an inkjet ink. Pigments have excellent fastnesses of various properties such as heat resistance, weather resistance and migration resistance, for example as compared to dyes. However, when the pigments are dispersed in a composition, they present potential problems such as increased composition viscosity after pigment dispersion, increased aggregation or precipitation in a composition, increased composition viscosity over time, and color flooding when heterogeneous pigments are mixed.

Recently, with the demands for high contrast liquid crystal displays, fine imaging devices, and high coloring/high sharpness inkjet ink, the demands for making micro-particle pigments and high concentration pigments in the dispersion compositions have greatly increased. However, as particle diameters become finer and concentrations of pigments increase, particles are prone to aggregation, thus making it difficult to obtain a stable dispersion composition.

In order to solve these problems, improvement of a pigment itself (surface treatment of pigment), development of dispersants and surfactants having good adsorption with pigments, and use of pigment dispersants have been proposed. Pigments used in a color filter or a inkjet ink may include phthalocyanine-based pigments, diketopyrrolopyrrole-based pigments, anthraquinone-based pigments, quinacridone-based pigments, dioxazine-based pigments, isoindoline-based pigments, isoindolinone-based pigments, azo-based pigments, and dye lake pigments. And a large number of pigment dispersants, in particular phthalocyanine-based pigments, anthraquinone-based pigments, and quinacridone-based pigments have been disclosed. For example, a method for mixing sulfonated products of a pigment or metal salts thereof with pigments (Patent Documents 1 to 3), a method for mixing substituted amino methyl derivatives (Patent Document 4), and a method for mixing phthalimide methyl derivatives (Patent Document 5) are known in the art.

The methods are effective for pigments with certain chemical structure, but are not useful for pigments with chemical structure, into which sulfone groups, amino methyl groups, phthalimide methyl groups, and the like are difficult to be introduced. In particular, because an appropriate pigment dispersant has not been provided for C.I. Pigment Yellow 150, which is commonly used in color filter and inkjet fields, the pigment is very difficult to disperse. In Patent Documents 6 and 7, an inclusion compound, in particular, a melamine compound is added into C.I. Pigment Yellow 150 to maintain dispersion stability, but the effects may not be obtained unless the melamine compound is added in an amount equal to or more than the pigment and the demand for high concentration pigments in the dispersion composition may not be satisfied.

Patent Document 1: Japanese Patent Application Publication (JP-B) No. 41-2466

Patent Document 2: Japanese Patent Application Laid-Open (JP-A) No. 63-172772

Patent Document 3: Japanese Patent Application Publication (JP-B) No. 50-4019

Patent Document 4: Japanese Patent Application Publication (JP-B) No. 39-16787

Patent Document 5: Japanese Patent Application Laid-Open (JP-A) No. 55-108466

Patent Document 6: Japanese Patent Application Laid-Open (JP-A) No. 2000-119544

Patent Document 7: Japanese Patent Application Laid-Open (JP-A) No. 2005-344055

DISCLOSURE OF THE INVENTION

Problem to be Solved by the Invention

The object of the present invention is to microparticulate a pigment having a structure derived from barbituric acid represented by C.I. Pigment Yellow 150 and to increase the concentration of the pigment in a dispersion composition without increasing the viscosity of the composition after dispersion of the pigment, increasing the aggregation or precipitation in the composition, or increasing the viscosity of the composition over time. Moreover, the object of the present invention is to provide a stable pigment composition which can be used as a coloring agent for a color filter resist or a inkjet ink.

Means of Solving the Problems

After studying hard to solve the problem, the inventors found that a metal complex of an azo compound including amino phenol sulfonic acid or a derivative thereof and barbituric acid, or a salt of the metal complex was used to solve the problems, which led to the invention.

That is, the invention relates to (1) a monoazo metal complex represented by the following formula (1)

[Chemical Formula 1]

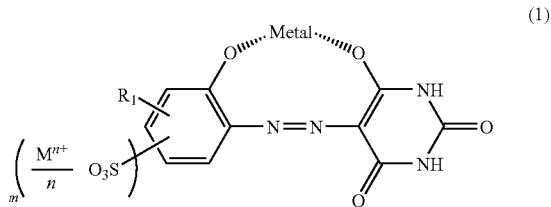

(In formula (1), $R_1$ represents a hydrogen atom, a $C_1$ to $C_4$ alkyl group, a $C_1$ to $C_4$ alkoxy group, a chlorine atom, a bromine atom or a nitro group. M represents a hydrogen atom, a sodium, a potassium, a magnesium, a calcium, a barium or an aluminum. $M^{n+}$ represents a n-valent cation. Metal represents Ni, Fe, Cu, Co, or Al. m represents an integer of 1 or 2, and n represents an integer of 1, 2, or 3.), (2) a monoazo metal complex represented by the following formula (2)

[Chemical Formula 2]

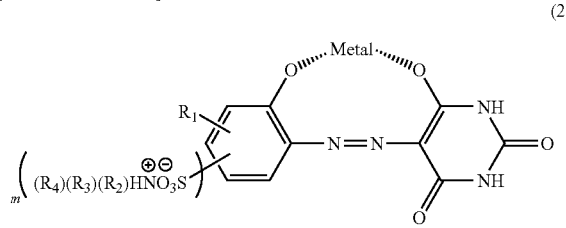

(In formula (2), $R_2$ to $R_4$ each independently represents a hydrogen atom, a $C_1$ to $C_{18}$ alkyl group, an aralkyl group, a $C_5$ or $C_6$ cycloalkyl group, an allyl group, or a $C_1$ to $C_{18}$ alkyl group substituted by a $C_5$ or $C_6$ cycloalkyl group. $R_1$, Metal, and m have the same meaning as those of the formula (1) as set forth in the preceding section (1).), (3) an azo-type pigment dispersant including:
the monoazo metal complex as set forth in the preceding section (1) or (2) as an effective ingredient, (4) a pigment composition including:
an organic pigment; the azo-type pigment dispersant as set forth in the preceding section (3); and a resin-type pigment dispersant.

(5) the pigment composition as set forth in the preceding section (4), wherein the resin-type pigment dispersant is a cationic dispersant, (6) the pigment composition as set forth in the preceding section (4), wherein an amount of the azo-type pigment dispersant added is 0.1 to 50% by weight based on the organic pigment, (7) the pigment composition as set forth in the preceding section (4), wherein the organic pigment is a yellow-based pigment having a structure derived from barbituric acid, (8) the pigment composition as set forth in the preceding section (7), wherein the organic pigment is C.I. Pigment Yellow 139 or 150, (9) a monoazo metal complex represented by the following formula (3)

[Chemical Formula 3]

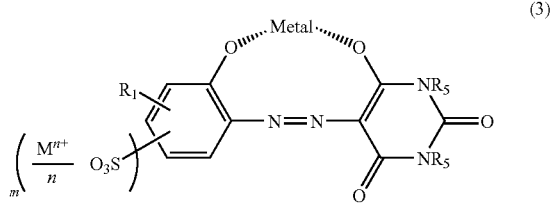

(In formula (3), $R_5$ represents a $C_1$ to $C_4$ alkyl group, a $C_1$ to $C_2$ alkoxy group, a chlorine atom or a bromine atom. $R_1$, M, $M^{n+}$, Metal, and m have the same meaning as those of formula (1) as set forth in the preceding section (1).),

(10) a monoazo metal complex represented by the following formula (4)

[Chemical Formula 4]

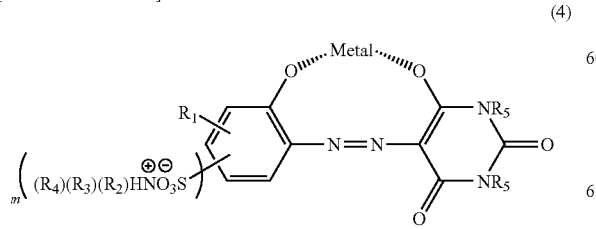

(In formula (4), $R_5$ represents a $C_1$ to $C_4$ alkyl group, a $C_1$ to $C_2$ alkoxy group, a chlorine atom, or a bromine atom. $R_2$ to $R_4$, $R_1$, Metal, and m have the same meaning as those of the formula (2) as set forth in the preceding section (2).),

(11) an azo-type pigment dispersant including:
the monoazo metal complex as set forth in the preceding section (9) or (10) as an effective ingredient.

(12) A pigment composition including:
an organic pigment; the azo-type pigment dispersant as set forth in the preceding section (11); and a resin-type pigment dispersant,

(13) the pigment composition as set forth in the preceding section (12), wherein the resin-type pigment dispersant is a cationic dispersant,

(14) the pigment composition as set forth in the preceding section (12), wherein an amount of the azo-type pigment dispersant added is 0.1 to 50% by weight based on the organic pigment,

(15) the pigment composition as set forth in the preceding section (12), wherein the organic pigment is a yellow-based pigment having a structure derived from barbituric acid, and

(16) the pigment composition as set forth in the preceding section (15), wherein the organic pigment is C.I. Pigment Yellow 139 or 150.

Effect of the Invention

A monoazo metal complex represented by formulae (1), (2), (3), and (4) of the present invention may be very easily prepared. And by using the metal complex as an azo-type pigment dispersant, a pigment having a structure derived from barbituric acid represented by C.I. Pigment Yellow 150 can be microparticulated and the concentration of the pigment in a dispersion composition can be increased without increasing the viscosity of the composition after dispersion of the pigment, increasing the aggregation or precipitation in the composition, or increasing the viscosity of the composition overtime. Therefore, a stable pigment composition which can be used as a coloring agent for a color filter resist or an inkjet ink can be provided.

BEST MODE FOR CARRYING OUT THE INVENTION

The structural character of a monoazo metal complex of the invention may include a metal complex containing an azo group having a sulfonic group. The monoazo metal complex represented by the formula (1) of the invention may be prepared, for example, in the following way. That is, after the diazotization of an aromatic amine represented by the following formula (A) is performed by the conventional method, a coupling reaction with a coupler represented by the following formula (B) may be performed at 0 to 40° C., preferably at 10 to 30° C. and at pH 3 to 10, preferably pH 4 to 8 to obtain an intermediate (C). Then a laking process of the intermediate (C) using a metal halide is performed to obtain a desired compound represented by the following formula (1).

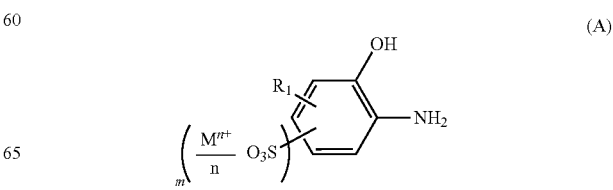

-continued

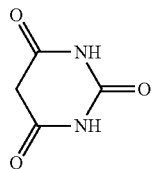
(B)

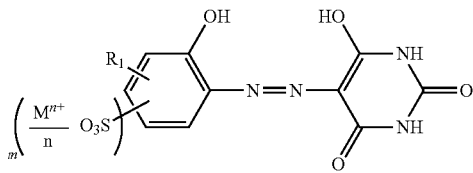
(C)

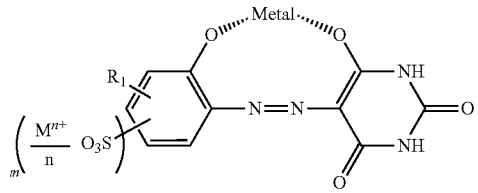
(1)

In formulae (A), (B), (C), and (1), $R_1$ represents a hydrogen atom, a $C_1$ to $C_4$ alkyl group, a $C_1$ to $C_4$ alkoxy group, a chlorine atom, a bromine atom, or a nitro group. M represents a hydrogen atom, a sodium, a potassium, a magnesium, a calcium, a barium or an aluminum, and $M^{n+}$ represents an n-valent cation. Metal represents Ni, Fe, Cu, Co, or Al. m represents an integer of 1 or 2, and n represents an integer of 1, 2, or 3.

A salt formation of the compound represented by formula (1) may be performed using various amines to obtain a desired compound represented by the following formula (2).

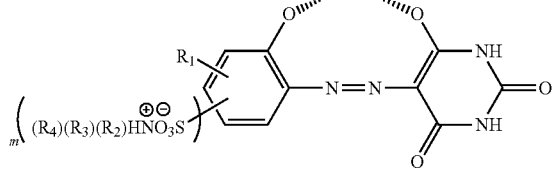
(2)

(In formula (2), $R_2$ to $R_4$ each independently represents a hydrogen atom, a $C_1$ to $C_{18}$ alkyl group, an aralkyl group, a $C_5$ or $C_6$ cycloalkyl group, an allyl group, or a $C_1$ to $C_{18}$ alkyl group substituted by a $C_5$ or $C_6$ cycloalkyl group. $R_1$, Metal, and m have the same meaning as those of formula (1).).

A $C_1$ to $C_4$ alkyl group in the formula (1) may include a methyl group, an ethyl group, an n-propyl group, an isopropyl group, an n-butyl group, an iso-butyl group, a sec-butyl group, a t-butyl group, and the like.

A $C_1$ to $C_4$ alkoxy group in the formula (1) may include a methoxy group, an ethoxy group, an n-propoxy group, an iso-propoxy group, an n-butoxy group, and the like.

An amine used during the salt formation of the compound represented by the formula (1) may include, for example, ammonia, dimethylamine, triethylamine, 2-ethylhexylamine, laurylamine, octadecylamine, oleylamine, benzylamine, rosin amine (18-amino Abieta-8, 11, 13-trien), and the like.

A $C_1$ to $C_{18}$ alkyl group in the formula (2) may include, for example, a methyl group, an ethyl group, an n-propyl group, an isopropyl group, an n-butyl group, an iso-butyl group, a sec-butyl group, a t-butyl group, a lauryl group, an octadecyl group, an oleyl group, a 2-ethyl hexyl group, a cyclohexyl methyl group, and the like.

An aralkyl group in the formula (2) may include, for example, a benzyl group, a phenyl ethyl group, and the like.

A $C_5$ or $C_6$ cycloalkyl group in the formula (2) may include a cyclopentyl group, a cyclohexyl group, and the like.

An aryl group in the formula (2) may include a phenyl group, a naphthyl group, and the like.

Next, specific examples of a monoazo metal complex represented by formulae (1) and (2) of the invention are illustrated in Tables 1 and 2 based on formulae (5) and (6). A sulfonic acid in Tables 1 and 2 is represented in the form of a free acid.

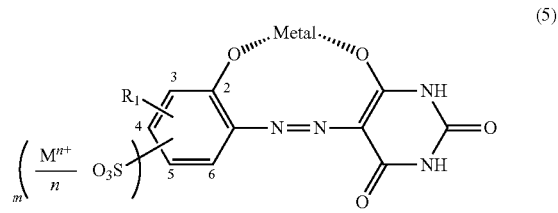
(5)

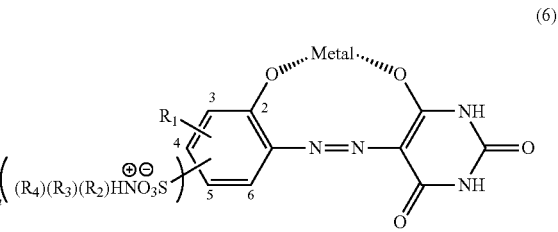
(6)

Compound Example 1

Specific Example Based on Formula (5)

TABLE 1

| Compound No. | R1 (Substitution Position) | Substitution Position | m | (M, n) | Metal |
|---|---|---|---|---|---|
| 1 | H | 5 | 1 | (H, 1) | Ni |
| 2 | $(CH_3)_3C$ (5) | 3 | 1 | (H, 1) | Ni |
| 3 | $(CH_3)_2CH$ (3) | 5 | 1 | (H, 1) | Ni |
| 4 | $CH_3O$ (5) | 4 | 1 | (H, 1) | Ni |
| 5 | Br (3) | 5 | 1 | (H, 1) | Ni |
| 6 | H | 5 | 1 | (Na, 1) | Ni |
| 7 | H | 5 | 1 | (Ca, 2) | Ni |
| 8 | H | 5 | 1 | (Ba, 2) | Ni |
| 9 | H | 5 | 1 | (Al, 3) | Ni |
| 10 | H | 5 | 1 | (H, 1) | Fe |
| 11 | H | 5 | 1 | (H, 1) | Cu |
| 12 | H | 5 | 1 | (H, 1) | Co |
| 13 | H | 5 | 1 | (H, 1) | Al |
| 14 | H | 4 | 1 | (H, 1) | Ni |
| 15 | H | 3 | 1 | (H, 1) | Ni |

Compound Example 2

Specific Example Based on Formula (6)

TABLE 2

| | R1 | | | | —SO₃⁻N⁺N(R₂)(R₃)(R₄) | | |
|---|---|---|---|---|---|---|---|
| Compound No. | (Substitution Position) | R₂ | R₃ | R₄ | Substitution Position | m | Metal |
| 16 | H | C₄H₉ | H | H | 5 | 1 | Ni |
| 17 | CH₃O (5) | C₄H₉ | H | H | 4 | 1 | Ni |
| 18 | H | C₄H₉ | C₄H₉ | H | 5 | 1 | Ni |
| 19 | H | C₂H₅ | C₂H₅ | C₂H₅ | 5 | 1 | Ni |
| 20 | H | C₄H₉CH(C₂H₅)CH₂ | H | H | 5 | 1 | Ni |
| 21 | H | CH₃(CH₂)₁₁ | H | H | 5 | 1 | Ni |
| 22 | H | CH₃(CH₂)₁₇ | H | H | 5 | 1 | Ni |
| 23 | H | (see structure) | H | H | 5 | 1 | Ni |
| 24 | H | (see structure) | H | H | 4 | 1 | Ni |

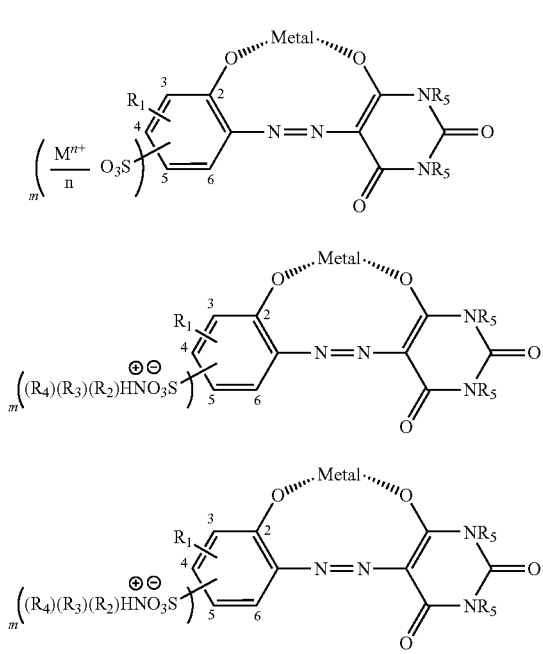

In addition, specific examples of a monoazo metal complex represented by formulae (3) and (4) of the invention are illustrated in Tables 3 and 4 based on formulae (7) and (8). A sulfonic acid in Tables 3 and 4 is represented in the form of a free acid.

Compound Example 3

Specific Example Based on Formula (7)

TABLE 3

| Compound No. | R1 (Substitution Position) | Substitution Position | m | (M, n) | R₅ | Metal |
|---|---|---|---|---|---|---|
| 25 | H | 5 | 1 | (H, 1) | CH₃ | Ni |
| 26 | (CH₃)₃C (5) | 3 | 1 | (H, 1) | CH₃ | Ni |
| 27 | (CH₃)₂CH (3) | 5 | 1 | (H, 1) | CH₃ | Ni |
| 28 | CH₃O (5) | 4 | 1 | (H, 1) | CH₃ | Ni |
| 29 | Br (3) | 5 | 1 | (H, 1) | CH₃ | Ni |
| 30 | H | 5 | 1 | (Na, 1) | C₂H₅ | Ni |
| 31 | H | 5 | 1 | (Na, 1) | C₃H₇ | Ni |
| 32 | H | 5 | 1 | (Na, 1) | CH₃O | Ni |
| 33 | H | 5 | 1 | (Na, 1) | Cl | Ni |
| 34 | H | 5 | 1 | (H, 1) | CH₃ | Fe |
| 35 | H | 5 | 1 | (H, 1) | CH₃ | Cu |
| 36 | H | 5 | 1 | (H, 1) | CH₃ | Co |
| 37 | H | 5 | 1 | (H, 1) | CH₃ | Al |
| 38 | H | 4 | 1 | (H, 1) | CH₃ | Ni |
| 39 | H | 3 | 1 | (H, 1) | CH₃ | Ni |

Compound Example 4

Specific Example Based on Formula (8))

TABLE 4

| | | | | | —SO₃⁻N⁺H(R₂)(R₃)(R₄) | | |
|---|---|---|---|---|---|---|---|
| Compound No. | R₁ | R₂ | R₃ | R₄ | R₅ | Substitution Position | m | Metal |
| 40 | H | C$_4$H$_9$ | H | H | CH$_3$ | 5 | 1 | Ni |
| 41 | H | C$_4$H$_9$ | C$_4$H$_9$ | H | CH$_3$ | 5 | 1 | Ni |
| 42 | H | C$_2$H$_5$ | C$_2$H$_5$ | C$_2$H$_5$ | CH$_3$ | 5 | 1 | Ni |
| 43 | H | C$_4$H$_9$CH(C$_2$H$_5$)CH$_2$ | H | H | CH$_3$ | 5 | 1 | Ni |
| 44 | H | CH$_3$(CH$_2$)$_{11}$ | H | H | CH$_3$ | 5 | 1 | Ni |
| 45 | H | CH$_3$(CH$_2$)$_{17}$ | H | H | CH$_3$ | 5 | 1 | Ni |
| | H | CH$_3$ | H | H | CH$_3$ | 5 | 1 | Ni |
| 46 | H | (dehydroabietyl-CH$_2$—) | H | H | CH$_3$ | 5 | 1 | Ni |
| 47 | H | (dehydroabietyl-CH$_2$—) | H | H | CH$_3$ | 4 | 1 | Ni |

The pigment composition of the invention may be prepared, for example, in the following way. That is, a method of mixing an organic pigment with an azo-type pigment dispersant may include a variety of well known methods, for example, a simple method of mixing each dry power or press cake, a mechanical mixing method by various dispersers such as a kneader, a beads mill, a dissolver, an attritor, and the like, and a method comprising suspending an organic pigment in water or organic solvent, admixing an azo-type pigment dispersant into the suspension, and uniformly depositing the mixture on the surface of the organic pigment, and the like. Next, a resin-type pigment dispersant and, if necessary, various organic solvents, resin varnish, various additives, and the like may be mixed with a mixture of an organic pigment and an azo-type pigment dispersant thus obtained and the mixture may be dispersed by a sandmill, an annular-type beads mill, an attritor to prepare a desired pigment composition. Also, an organic pigment, an azo-type pigment dispersant of the invention, and a resin-type pigment dispersant, and, if necessary, other ingredients may be collectively mixed and dispersed. In addition, the amount of an azo-type pigment dispersant added may be 0.1 to 50% by weight, preferably 0.5 to 30% by weight, and more preferably 1 to 20% by weight, based on an organic pigment. When the mixing ratio of the azo-type pigment dispersant is too low, it may be impossible to attain an intended dispersion stability and microparticularization of the pigment, and when the mixing ratio is too high, the dispersion stability may be degraded. Thus, an optimum mixing ratio is needed.

An organic pigment useful for a pigment composition of the present invention is not specifically limited if it is well known in the art such as those listed in color index, but because a monoazo metal complex as an azo-type pigment dispersant of the invention itself has a yellow hue, it is preferred that a yellow series organic pigment may be used so that the inherent hue of the organic pigment is not changed. Also, in the sense that a pigment is excellent in terms of compatibility with a structure derived from the barbituric acid of a monoazo metal complex of the present invention, it is desirable to have a pigment having a structure derived from a barbituric acid in the structure. Also, "a pigment having a structure derived from barbituric acid" of the application refers to a pigment having a structural region derived from barbituric acid in the structure. Thus, as a more desirable organic pigment, a yellow series pigment having a structure derived from barbituric acid may include C.I. Pigment Yellow 139, 150, 185, and the like.

Specific examples of "a pigment having a structure derived from barbituric acid" include a structure of C.I. Pigment Yellow 139 represented by the following formula (9), a structure of C.I. Pigment Yellow 150 represented by formula (10), and a structure of C.I. Pigment Yellow 185 represented by formula (11).

[Chemical Formula 9]

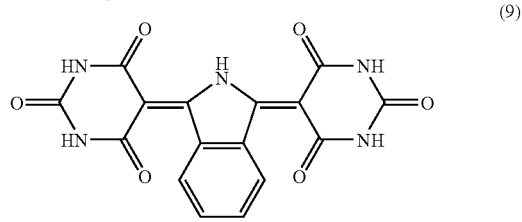

(9)

[Chemical Formula 10]

Nickel complex of

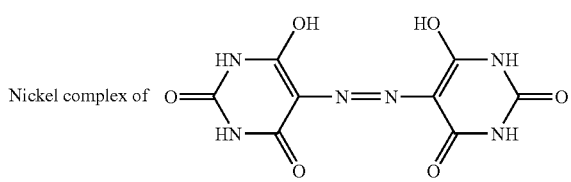

(10)

[Chemical Formula 11]

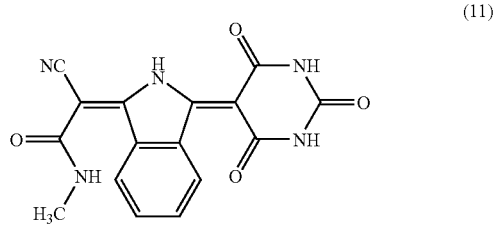

(11)

A resin-type pigment dispersant useful for the pigment composition of the invention is not specifically limited if it is a resin-type pigment dispersant well known in the art. However, considering the compatibility with a sulfonic acid derivative region of the azo-type pigment dispersant of the invention, it is more desirable to use a cationic resin-type dispersant. Cationic resin-type dispersants include, for example, BYK112, 116, 140, 142, 161, 162, 164, 166, 182, 2000, 2001, 2050, 2070, and 2150 manufactured by BYK Japan KK, EFKA4010, 4015, 4020, 4050, 4055, 4060, 4300, 4330, 4400, and 4406 manufactured by EFKA Additives, SOLSPERSE 24000 and 32500 manufactured by Lubrizol Corporation., and Ajispa PB711, 821, and 822 manufactured by Ajinomoto Fine-Techno Co., Inc. The resin-type pigment dispersant may be added in an amount of 5 to 100 parts by weight, more preferably 10 to 50 parts by weight, based on 100 parts by weight of the pigment. When the resin-type pigment dispersant is added in less than an amount of 5 parts by weight, it may be impossible to obtain good dispersion stability.

An organic solvent may be added to the pigment composition of the invention, if necessary. A useful organic solvent is not specifically limited, but may include propylene glycol monomethyl ether acetate, propylene glycol monomethyl ether, propylene glycol monoethyl ether, ethyl cellosolve acetate, butyl cellosolve acetate, ethyl cellosolve, cyclohexanone, ethylene glycol diethyl ether, diethylene glycol dimethyl ether, diethylene glycol diethyl ether, ethyl acetate, butyl acetate, methanol, ethanol, isopropyl alcohol, and the like. These may be used alone or in combination of two or more and may be used in an amount of 90% or less by weight based on the pigment composition.

The pigment composition of the invention may further include a resin varnish, if necessary. The resin varnish may include styrene-based (co)polymer, (metha)acrylic acid ester-based (co)polymer, styrene-maleic acid ester-based copolymer, cellulose acetate-based resin, polyester-based resin, polyurethane-based resin, polyamide-based resin, polyimide-based resin, and the like. These may be used alone or in combination of two or more and may be used in an amount of 50% or less by weight based on the pigment composition.

If necessary, other additives which may be added to the pigment composition of the invention may include, for example, thixotropic tackifier, polymerizable resin and polymerization initiator or curing agent, curing promoter, inhibitor, organic or inorganic filer, coupling agent, and the like, may be selected according to specific purposes of the pigment composition, but are not limited thereto. Also, the amount of the additive added may be selected according to specific purposes.

The use of the pigment composition of the invention is not specifically limited, and includes various uses, for example, various printing ink compositions like gravure ink, paint, dry- or wet-type toner for use in electrophotography, inkjet ink, and coloring agent for a color filter resist. In particular, the pigment composition of the invention is useful for a coloring agent for a color filter resist or an inkjet ink requiring a microparticulate pigment and its high stability.

EXAMPLES

The invention will be described in detail according to examples below. Also, in the specification, all "parts" and "percentages" are by weight unless otherwise stated.

Example 1

Synthesis of a Material Represented by Compound No. 1 in Table 1

94.6 parts of 2-aminophenol-4-sulfonic acid was suspended in 500 parts of water, and sodium hydroxide was used to completely dissolve the suspension at pH 6 to 7. 38.0 parts of sodium nitrite was also added to completely dissolve the suspension. The dissolved solution was dripped into 450 parts of 14% aqueous hydrochloric acid solution at 5 to 10° C. for 30 minutes. The mixture was stirred for 2 hours to perform a diazotization reaction. Subsequently, all the diazotized solution was dripped into an aqueous solution, in which 64 parts of barbituric acid are dissolved in 2400 parts of water, at 10 to 15° C. for 30 minutes and caustic acid was used to adjust pH of the mixture at 5 to 6. After a reaction was performed at the same temperature and pH for 15 hours, the solid phase was separated by filtration to obtain 151 parts of a compound represented by formula (12). Next, 151 parts of the compound represented by formula (12) was dissolved in 2500 parts of water, and the resulting aqueous solution was heated to 90° C. Then 109.3 parts of nickel chloride hexahydrate which was dissolved in 450 parts of water was dripped into the aqueous solution for 30 minutes. After the dripping was completed, hydrochloric acid was used for pH at 1 to 1.5, the aqueous solution was stirred under the same conditions at 90° C. for 1 hour to perform a laking process. After the reaction was completed, sodium hydroxide was used for pH at 6 to 7, and a filtration was performed. The wet cake thus obtained was blow-dried with a hot air drier at 80° C. to yield 164 parts of a compound represented by formula (13).

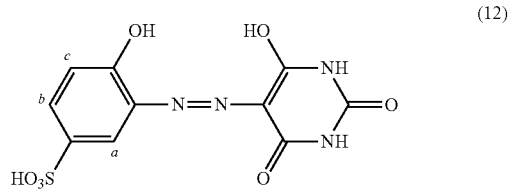

(12)

-continued

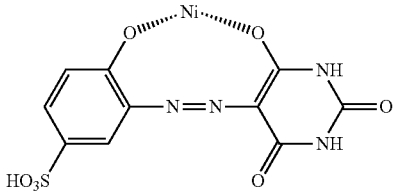

(13)

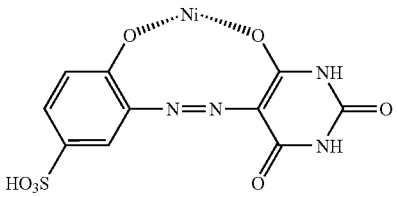

(13)

Physical property data of a compound represented by formula (12)
$^1$H-NMR (D$_2$O); 6.95 (corresponding to c:s, 1H) 7.43 (corresponding to b:s, 1H) 7.94 (corresponding to a:s, 1H)

Example 2

Synthesis of a Material Represented by Compound No. 23 in Table 2

After 103.8 parts of the compound obtained in Example 1 was suspended in 7500 parts of water, sodium hydroxide was used at 20 to 25° C. for pH adjustment at 10 to dissolve a monoazo metal complex. To the thus obtained aqueous solution, a aqueous solution, in which 71.3 parts of 18-amino Abieta-8, 11, 13-trien was dissolved in 450 parts of 3.3% acetic acid aqueous solution, was dripped at 20 to 25° C. for 30 minutes, and the mixture was stirred at the same temperature for 1 hour, followed by filtration. A wet cake thus obtained was blow-dried at 80° C. to obtain 166 parts of a compound represented by Compound No. 23 in Table 2.

Example 3

Synthesis of a Material Represented by Compound No. 14 in Table 1

A synthesis was performed in the same way as in Example 1, except that 2-aminophenol-4-sulfonic acid was replaced with 2-aminophenol-5-sulfonic acid, to obtain 160 parts of a compound represented by Compound No. 14 in Table 1.

Example 4

Synthesis of a Material Represented by Compound No. 24 in Table 2

A synthesis was performed in the same way as in Example 2, except that the compound obtained in Example 1 was replaced with the compound obtained in Example 3, to obtain 165 parts of a compound represented by Compound No. 24 in Table 2.

Example 5

Synthesis of a Material Represented by Compound No. 25 in Table 3

After 94.6 parts of 2-aminophenol-4-sulfonic acid was suspended in 500 parts of water, sodium hydroxide was used to completely dissolve the suspension at pH 6 to 7, and 38.0 parts of sodium nitrite was also added to completely dissolve the suspension. The dissolved solution was dripped into 450 parts of 14% aqueous hydrochloric acid solution at 5 to 10° C. for about 30 minutes and the mixture was stirred for about 2 hours at the same temperature to perform a diazotization reaction. Subsequently, all the diazotized solution was dripped into an aqueous solution, in which 78.1 parts of dimethyl barbituric acid are dissolved in 2400 parts of water, at 10 to 15° C. for 30 minutes and caustic acid was used to adjust pH of the mixture at 5 to 6. After a reaction was performed at the same temperature and pH for 15 hours, the solid phase was separated by filtration to obtain 167 parts of a compound represented by formula (14). Next, 151 parts of the compound represented by formula (14) was dissolved in 2500 parts of water, and the resulting aqueous solution was heated to 90° C. 109.3 parts of nickel chloride hexahydrate which was dissolved in 450 parts of water was dripped into the aqueous solution for 30 minutes. After the dripping was completed, hydrochloric acid was used for pH at 1 to 1.5. The solution was stirred under the same conditions at 90° C. for 1 hour to perform a laking process. After the reaction was completed, sodium hydroxide was used for pH at 6 to 7, and a filtration was performed. The wet cake thus obtained was blow-dried with a hot air drier at 80° C. to yield 180 parts of a compound represented by formula (15).

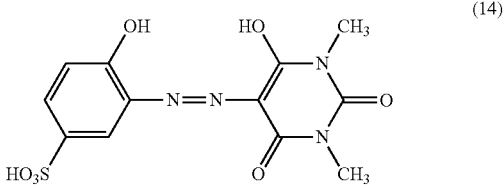

(14)

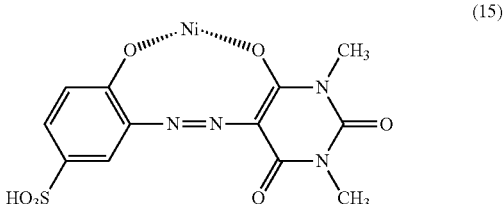

(15)

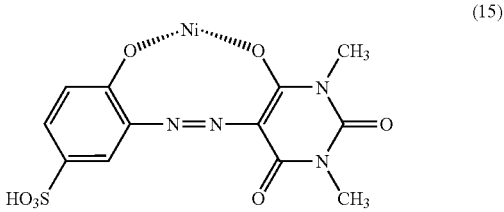

(15)

Example 6

Preparation of a Pigment Composition

A mixture of 15 parts of C.I. Pigment Yellow 150 (Yellow E4GN-GT, manufactured by LANXESS) as an organic pigment, 0.8 parts of the compound obtained in Example 1 as an azo-type pigment dispersant, 15 parts of acrylic resin (dissolution of a copolymer of methacrylic acid: benzyl methacrylate=75:25 (molar ratio) with propylene glycol monomethyl ether acetate for a solid content of 35%, MW to 10,000) as a resin vanish, 11.3 parts of BYK2000 (manufactured by BYK Japan KK, cationic dispersant, solid content 40%) as a resin-type pigment dispersant, 33 parts of propylene glycol monomethyl ether acetate as a solvent, 8.3 parts of ethoxy propanol, and 16.6 parts of cyclohexanone as a solvent was dispersed by a paint shaker using 0.3 mm zirconia beads for 1 hour. A dispersion thus obtained was filtered with a 5-μm filter to manufacture a pigment composition.

Example 7

Preparation of a Pigment Composition

A pigment composition was manufactured in the same way as in Example 6, except that a compound obtained in Example 1 was replaced with a compound obtained in Example 2.

Example 8

Preparation of a Pigment Composition

A pigment composition was manufactured in the same way as in Example 6, except that C.I. Pigment Yellow 150 (Yellow E4GN-GT, manufactured by LANXESS) was replaced with C.I. Pigment Yellow 139 (Yellow 2R-CF, manufactured by Ciba Speciality Chemicals Co. Ltd).

Comparative Example 1

Preparation of a Pigment Composition

A pigment composition was manufactured in the same way as in Example 6, except that a composition obtained in Example 1 was not used.

Comparative Example 2

Preparation of a Pigment Composition

A pigment composition was manufactured in the same way as in Example 8, except that a composition obtained in Example 1 was not used.

With reference to pigment compositions in Examples 6 to 8 and Comparative Examples 1 and 2, average particle diameters of the pigment compositions were measured with a laser scattering particle diameter distribution measurement device and viscosities were measured with a B-type viscometer under conditions of 10 rpm at room temperature (25° C.). Also, in the sense of confirming the conservation stability, viscosity measurements were performed after the pigment composition was kept at 50° C. for 3 days and 7 days, besides at the initial step (immediately after manufacturing). The results are illustrated in Table 5.

Results of Evaluating a Pigment Composition

As apparent from Table 5, it can be seen that pigment compositions in Examples 6 to 8 have smaller average particle diameters and microparticulation sizes than pigment compositions in Comparative Examples 1 and 2. Also, due to lower initial viscosities as compared to Comparative Examples, the workability is not damaged during the actual use. Also, a good result is shown in preservation stability.

Specifically, when C.I. Pigment Yellow 150 was used in an organic pigment, Examples have lower initial particle diameters by 5 nm and lower initial viscosities by 14% or more, when compared to Comparative Examples. Also, with reference to viscosity increases after 7 days, 60% of viscosity increases was shown in Comparative Examples, while 9% or less was shown in Examples.

Likewise, when C.I. Pigment Yellow 139 was used in an organic pigment, Examples have lower initial particle diameters by 10 nm and lower initial viscosities by 6% or more, when compared to Comparative Examples. Also, with reference to viscosity increases after 7 days, 6% or more of viscosity increases was shown in Comparative Examples, while there's no viscosity increases in Examples.

Example 9

Preparation of a Pigment Composition

A mixture of 20 parts of C.I. Pigment Yellow 150 (Yellow E4GN-GT, manufactured by LANXESS) as an organic pigment, 2 parts of the compound obtained in Example 1 as an azo-type pigment dispersant, 14 parts of PB822 (manufactured by Ajinomoto Fine-Techno Co., Inc, cationic dispersant, solid content 100%) as a resin-type pigment dispersant, 64 parts of diethylene glycol diethyl ether as a solvent, and 0.3 parts of BYK065 (manufactured by BYK Japan KK) as an antifoaming agent was dispersed by a paint shaker using 0.3 mm zirconia beads for 1 hour. A dispersion thus obtained was filtered with a 5-μm filter to manufacture a pigment composition.

Comparative Example 3

Preparation of a Pigment Composition

A pigment composition was manufactured in the same way as in Example 9, except that a compound obtained in Example 1 was not used.

Comparative Example 4

Preparation of a Pigment Composition

A pigment composition was manufactured in the same way as in Example 9, except that SOLSPERSE 22000 (manufactured by Lubrizol Japan Corp., Yellow Pigment Dispersant) was used instead of the compound obtained in Example 1.

With reference to pigment compositions in Example 9 and Comparative Examples 3 and 4, viscosities were measured

TABLE 5

| Test No. | Azo-type pigment dispersant | Organic pigment | Resin-type pigment dispersant | Initial Particle diameter (nm) | Initial viscosity (mPa·s) | Viscosity after kept at 50° C. for 3 days (mPa·s) | Viscosity after kept at 50° C. for 7 days (mPa·s) |
| --- | --- | --- | --- | --- | --- | --- | --- |
| Example 6 | Compound in Example 1 | C.I.P.Y. 150 | BYK2000 | 125 | 7.2 | 7.2 | 7.2 |
| Example 7 | Compound in Example 2 | C.I.P.Y. 150 | BYK2000 | 125 | 9.0 | 9.3 | 9.8 |
| Example 8 | Compound in Example 1 | C.I.P.Y. 139 | BYK2000 | 120 | 7.0 | 7.0 | 7.0 |
| Comparative Example 1 | — | C.I.P.Y. 150 | BYK2000 | 130 | 10.5 | 14.6 | 16.8 |
| Comparative Example 2 | — | C.I.P.Y. 139 | BYK2000 | 130 | 7.5 | 7.7 | 7.9 | with a B-type viscometer under conditions of 10 rpm at room temperature (25° C.). Also, in the sense of confirming the conservation stability, viscosity measurements were performed after the pigment composition was kept at 50° C. for 2 days and 10 days, besides at the initial step (immediately after manufacturing). Also, in order to confirm the microparticulate state of the dispersion, filter tests (the pigment composition was filtered with a membrane filter of pore diameter 0.45 μm and diameter 25 mm to measure a filtered flow) were performed. The results are illustrated in Table 6.

Results of Evaluating a Pigment Composition

TABLE 6

| Test No. | Azo-type pigment dispersant | Organic pigment | Resin-type pigment dispersant | Initial viscosity (mPa·s) | Viscosity after kept at 50° C. for 2 days (mPa·s) | Viscosity after kept at 50° C. for 10 days (mPa·s) | Filterated flow |
|---|---|---|---|---|---|---|---|
| Example 9 | Compound in Example 1 | C.I.P.Y. 150 | PB822 | 3.0 | 3.4 | 3.4 | 100 mL or more |
| Comparative Example 3 | — | C.I.P.Y. 150 | PB822 | 3.2 | 48 | gelatinization | 20 mL |
| Comparative Example 4 | SOLSPERSE 22000 | C.I.P.Y. 150 | PB822 | 2.7 | 4.8 | 7.3 | 1 mL |

As apparent from Table 6, a pigment composition in Example 9 showed a good result about high temperature stability, when compared to Comparative Examples 3 and 4. Also, a good result about a filtered flow was illustrated, which suggests that the microparticularization of the dispersion was proceeded by the addition of a compound obtained in Example 1.

Specifically, when C.I. Pigment Yellow 150 was used in an organic pigment, Comparative examples showed about 3-fold increases and gelatinization in viscosity increases at 50° C. after 10 days, while Examples showed 14% or less. Also, filtered flows of 1 to 20 mL were shown in Comparative Examples, while 100 mL or more filtered through in Examples.

From the results, it is apparent that a good pigment composition may be obtained by using a monoazo metal complex of the invention as an azo-type pigment dispersant without increasing the viscosity of the composition after dispersion of the pigment, flocculation or precipitation in the composition, or increasing the viscosity of the composition over time even when a yellow-based pigment having a structure derived from barbituric acid represented by C.I. Pigment Yellow 150 which has been difficult to disperse, was used. Also, an azo-type pigment dispersant of the invention meets the demands to increase the concentration of the pigment in the pigment dispersant composition because the effects are obtained even when about 5% of the pigment dispersant based on the pigment is used. From these results, it is apparent that a pigment composition including an azo-type pigment dispersant of the invention may be useful as a coloring agent for a color filter resist or an inkjet ink.

The invention claimed is:

1. A pigment dispersant comprising:
a monoazo metal complex represented by the following formula (1):

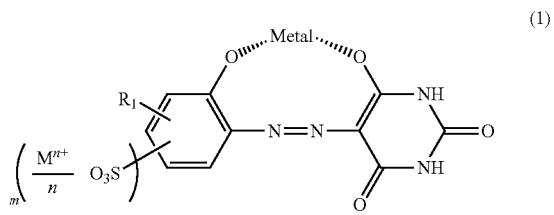

(1)

wherein, $R_1$ represents a hydrogen atom, a $C_1$ to $C_4$ alkyl group, a $C_1$ to $C_4$ alkoxy group, a chlorine atom, a bromine atom or a nitro group; $M^{n+}$ represents an n-valent cation selected from the group consisting of cations of hydrogen, sodium, potassium, magnesium, calcium, barium and aluminum; Metal represents Ni, Fe, Cu, Co, or Al; m represents an integer of 1 or 2, and n represents an integer of 1, 2, or 3.

2. A monoazo metal complex represented by the following formula (2):

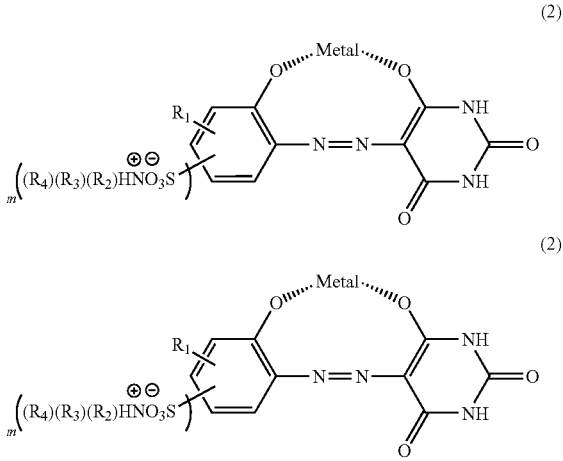

wherein, $R_1$ represents a hydrogen atom, a $C_1$ to $C_4$ alkyl group, a $C_1$ to $C_4$ alkoxy group, a chlorine atom, a bromine atom or a nitro group; $R_2$ to $R_4$ each independently represents a hydrogen atom, a $C_1$ to $C_{18}$ alkyl group, an aralkyl group, a $C_5$ or $C_6$ cycloalkyl group, an allyl group, or a $C_1$ to $C_{18}$ alkyl group substituted by a $C_5$ or $C_6$ cycloalkyl group; Metal represents Ni, Fe, Cu, Co, or Al; m represents an integer of 1 or 2.

3. A pigment dispersant comprising:
the monoazo metal complex as set forth in claim 2.

4. A pigment composition comprising:
an organic pigment;
the pigment dispersant as set forth in claim 1 or 3; and
a resin dispersant.

5. The pigment composition of claim 4, wherein the resin dispersant is a cationic dispersant.

6. The pigment composition of claim 4, wherein an amount of the pigment dispersant added is 0.1 to 50% by weight based on the organic pigment.

7. The pigment composition of claim 4, wherein the organic pigment is a yellow-based pigment having a structure derived from barbituric acid.

8. The pigment composition of claim 7, wherein the organic pigment is C.I. Pigment Yellow 139 or 150.

9. A monoazo metal complex represented by the following formula (3):

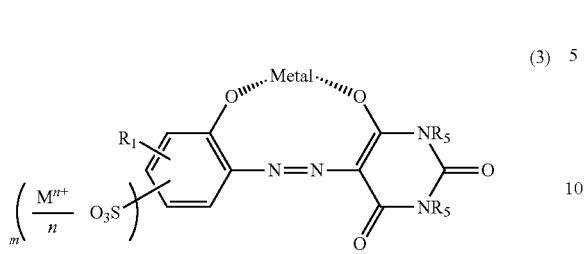

(3)

wherein, $R_1$ represents a hydrogen atom, a $C_1$ to $C_4$ alkyl group, a $C_1$ to $C_4$ alkoxy group, a chlorine atom, a bromine atom or a nitro group; $R_5$ represents a $C_1$ to $C_4$ alkyl group, a $C_1$ to $C_2$ alkoxy group, a chlorine atom or a bromine atom; $M^{n+}$ represents an n-valent cation selected from the group consisting of cations of hydrogen, sodium, potassium, magnesium, calcium, barium and aluminum; Metal represents Ni, Fe, Cu, Co, or Al; m represents an integer of 1 or 2.

10. A monoazo metal complex represented by the following formula (4):

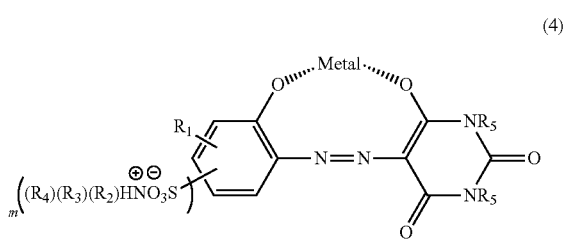

(4)

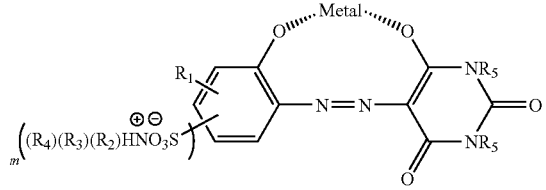

(4)

wherein, $R_1$ represents a hydrogen atom, a $C_1$ to $C_4$ alkyl group, a $C_1$ to $C_4$ alkoxy group, a chlorine atom, a bromine atom or a nitro group; $R_2$ to $R_4$ each independently represents a hydrogen atom, a $C_1$ to $C_{18}$ alkyl group, an aralkyl group, a $C_5$ or $C_6$ cycloalkyl group, an allyl group, or a $C_1$ to $C_{18}$ alkyl group substituted by a $C_5$ or $C_6$ cycloalkyl group; $R_5$ represents a $C_1$ to $C_4$ alkyl group, a $C_1$ to $C_2$ alkoxy group, a chlorine atom, or a bromine atom; Metal represents Ni, Fe, Cu, Co, or Al; m represents an integer of 1 or 2.

11. A pigment dispersant comprising:
the monoazo metal complex as set forth in claim 9 or 10.

12. A pigment composition comprising:
an organic pigment;
the pigment dispersant as set forth in claim 11; and
a resin dispersant.

13. The pigment composition of claim 12, wherein the resin pigment dispersant is a cationic dispersant.

14. The pigment composition of claim 12, wherein an amount of the pigment dispersant added is 0.1 to 50% by weight based on the organic pigment.

15. The pigment composition of claim 12, wherein the organic pigment is a yellow-based pigment having a structure derived from barbituric acid.

16. The pigment composition of claim 15, wherein the organic pigment is C.I. Pigment Yellow 139 or 150.

* * * * *